US012767169B2

(12) United States Patent
Xiao et al.

(10) Patent No.: US 12,767,169 B2
(45) Date of Patent: Oct. 20, 2026

(54) METHODS AND SYSTEMS FOR PARKING ZONE MAPPING AND VEHICLE LOCALIZATION USING MIXED-DOMAIN NEURAL NETWORK WITH ALTITUDE COMPENSATION

(71) Applicant: Connaught Electronics Ltd., Tuam (IE)

(72) Inventors: Xinhua Xiao, San Mateo, CA (US); Lihao Wang, San Mateo, CA (US); Hung-Cheng Huang, San Mateo, CA (US); Rachid Benmokhtar, Creteil (FR)

(73) Assignee: Connaught Electronics Ltd. (IE)

(*) Notice: Subject to any disclaimer, the term of this patent is extended or adjusted under 35 U.S.C. 154(b) by 255 days.

(21) Appl. No.: 18/405,179

(22) Filed: Jan. 5, 2024

(65) Prior Publication Data

US 2025/0222950 A1 Jul. 10, 2025

(51) Int. Cl.
*G05D 1/00* (2024.01)
*B60W 50/06* (2006.01)
(Continued)

(52) U.S. Cl.
CPC .......... *B60W 60/001* (2020.02); *B60W 50/06* (2013.01); *G06T 3/00* (2013.01);
(Continued)

(58) Field of Classification Search
CPC .................................................. B60W 60/001
See application file for complete search history.

(56) References Cited

U.S. PATENT DOCUMENTS 10,417,570 B2 9/2019 Florence et al.
2001/0028350 A1* 10/2001 Matsuoka .......... G01C 21/3635 701/532
(Continued)

FOREIGN PATENT DOCUMENTS

WO 2018141717 A1 8/2018

OTHER PUBLICATIONS

Tong Qin, Tongqing Chen, Yilun Chen and Qing Su, AVP-SLAM: Semantic Visual Mapping and Localization for Autonomous Vehicles in the Parking Lot, Jul. 8, 2020, pp. 1-7.
(Continued)

*Primary Examiner* — Ramon A. Mercado
*Assistant Examiner* — Paul W Arellano
(74) *Attorney, Agent, or Firm* — Dickinson Wright PLLC

(57) ABSTRACT

Methods and systems for assisting a vehicle to park using mixed-domain image data. Image-domain data is generated based on raw image data received from a plurality of cameras mounted on a vehicle. A bird's-eye-view (BEV) image is generated based on the raw image data. BEV-domain data associated with the BEV image is generated, which includes data associated with parking landmarks in the parking zone. A tri-perspective view (TPV) and associated data can be generated. A computing system localizes the vehicle within the parking zone based on the BEV-domain data, the image-domain data, and the TPV-domain data to generate localization data. The computing system performs mapping of the parking zone based on all three image-domain data and the localization data. A motion sensor such as an inertial measurement unit (IMU) can generate data that is used to compensate the various domain data.

13 Claims, 7 Drawing Sheets

(51) Int. Cl.

| | |
|---|---|
| ***B60W 60/00*** | (2020.01) |
| ***G06T 3/00*** | (2006.01) |
| ***G06T 7/73*** | (2017.01) |
| ***G06T 15/20*** | (2011.01) |

(52) U.S. Cl.

CPC .............. *G06T 7/74* (2017.01); *G06T 15/205* (2013.01); *B60W 2420/403* (2013.01); *B60W 2556/40* (2020.02); *G06T 2207/20081* (2013.01); *G06T 2207/20084* (2013.01); *G06T 2207/30204* (2013.01); *G06T 2207/30264* (2013.01)

(56) References Cited

U.S. PATENT DOCUMENTS

2015/0057920 A1* 2/2015 Von Zitzewitz ........ G06F 16/29 701/409
2019/0211919 A1* 7/2019 Nishimura .............. F16H 59/66
2021/0168996 A1* 6/2021 Lee ...................... G05D 1/0278
2021/0263154 A1* 8/2021 Herman .................. G01S 17/26
2022/0178715 A1 6/2022 Golgiri et al.
2023/0071437 A1* 3/2023 Kim ........................ G01S 17/89
2023/0078721 A1* 3/2023 Wang ................. G01C 21/3476 701/533

OTHER PUBLICATIONS

Daniele Cattaneo, Matteo Vaghi, and Abhinav Valada, LCDNet: Deep Loop Closure Detection and Point Cloud Registration for LiDAR SLAM, Feb. 8, 2022, pp. 1-20.
Carlos Campos, Richard Elvira, Juan J. Gomex Rodriquez, Jose M.M. Montiel, Duan D. Tardos, ORB-SLAM3: An Accurate Open-Source Library for Visual, Visual-Inertial, and Multimap Slam, IEEE Transactions on Robotics, vol. 37, No. 6, Dec. 2021, pp. 1-17.
Hudson Martins Silva Bruno, Esther Luna Colombini, LIFT-SLAM: a deep-learning feature-based monocular visual SLAM method, Laboratory of Robotic and Cognitive Systems, Institute of Computing, State University of Compinas, Caminas, Sao Paulo, Brazil, Jun. 1, 2021, pp. 1-30.
Irem Ulku and Erdem Akagunduz, A Survey on Deep Learning-Based Architectures for Semantic Segmentation on 2D Images, Mar. 17, 2022, pp. 1-30.

* cited by examiner

METHODS AND SYSTEMS FOR PARKING ZONE MAPPING AND VEHICLE LOCALIZATION USING MIXED-DOMAIN NEURAL NETWORK WITH ALTITUDE COMPENSATION

TECHNICAL FIELD

The present disclosure relates to methods and systems for parking zone mapping and vehicle localization using a mixed-domain neural network, with altitude compensation. The present disclosure also relates to methods and systems for assisting a vehicle to park using a mixed-domain neural network

BACKGROUND

Modern automotive vehicles are typically equipped with a variety of sensors. Whether internal or external to the passenger cabin of the vehicle, these sensors provide the foundation for driving automation and vehicle autonomy. Vehicles with autonomous or semi-autonomous driving or driver-assistant features use these sensors and associated computer vision technology to provide parking assistance. Parking assist systems can help drivers park their vehicles in parking spaces, either automatically or guiding the driver to do so.

SUMMARY

In one embodiment, a method of mapping a parking zone using mixed-domain image data includes the following: receiving images from a plurality of cameras mounted about a vehicle, wherein the images depict the parking zone outside of the vehicle; executing a feature-detection model on the received images to generate image-domain data associated with the parking zone; generating a bird's-eye-view (BEV) image based on the received images; generating BEV-domain data associated with the BEV image, wherein the BEV-domain data includes data associated with parking landmarks in the parking zone; generating a tri-perspective view (TPV) image based on the received images; generating TPV-domain data associated with the TPV image, wherein the TPV-domain data includes data associated with the parking landmarks in the parking zone; localizing the vehicle within the parking zone based on the image-domain data, the BEV-domain data, and the TPV-domain data to generate localization data; and mapping the parking zone based on the image-domain data, the BEV-domain data, the TPV-domain data, and the localization data.

In another embodiment, a method of mapping a parking zone using mixed-domain image data includes the following: generating image-domain data based on raw image data received from a plurality of cameras mounted on the a, wherein the raw image data is associated with the parking zone outside the vehicle, and wherein the image-domain data is generated by a feature-detection machine learning model; generating a bird's-eye-view (BEV) image based on the raw image data, wherein the BEV image is a projected image of the parking zone; generating BEV-domain data associated with the BEV image, wherein the BEV-domain data includes data associated with parking landmarks in the parking zone; receiving vehicle motion data from an inertial measurement unit (IMU) mounted to the vehicle; localizing the vehicle within the parking zone based on the BEV-domain data and the image-domain data to generate localization data; compensating the BEV-domain data and the image-domain data based on the vehicle motion data received from the IMU; and mapping the parking zone based on the compensated BEV-domain data, the compensated image-domain data, and the localization data.

In another embodiment, a system for mapping a parking zone using mixed-domain image data includes a plurality of image sensors mounted to a vehicle and configured to generate raw image data, wherein the raw image data is associated with the parking zone outside the vehicle. The system includes an inertial measurement unit (IMU) mounted to the vehicle and configured to generate movement data associated with movement of the vehicle. The system includes one or more processors and memory coupled thereto, wherein the memory stores instructions that, when executed by the one or more processors, cause the one or more processors to perform the following: generate image-domain data based on the raw image data, wherein the image-domain data is generated by a feature-detection machine learning model; generate a bird's-eye-view (BEV) image based on the raw image data, wherein the BEV image is a projected image of the parking zone; generate BEV-domain data associated with the BEV image, wherein the BEV-domain data includes data associated with parking landmarks in the parking zone; localize the vehicle within the parking zone based on the BEV-domain data and the image-domain data to generate localization data; compensate the BEV-domain data and the image-domain data based on the vehicle movement data received from the IMU; and output a map of the parking zone based on the compensated BEV-domain data, the compensated image-domain data, and the localization data.

DETAILED DESCRIPTION

Figure 1:
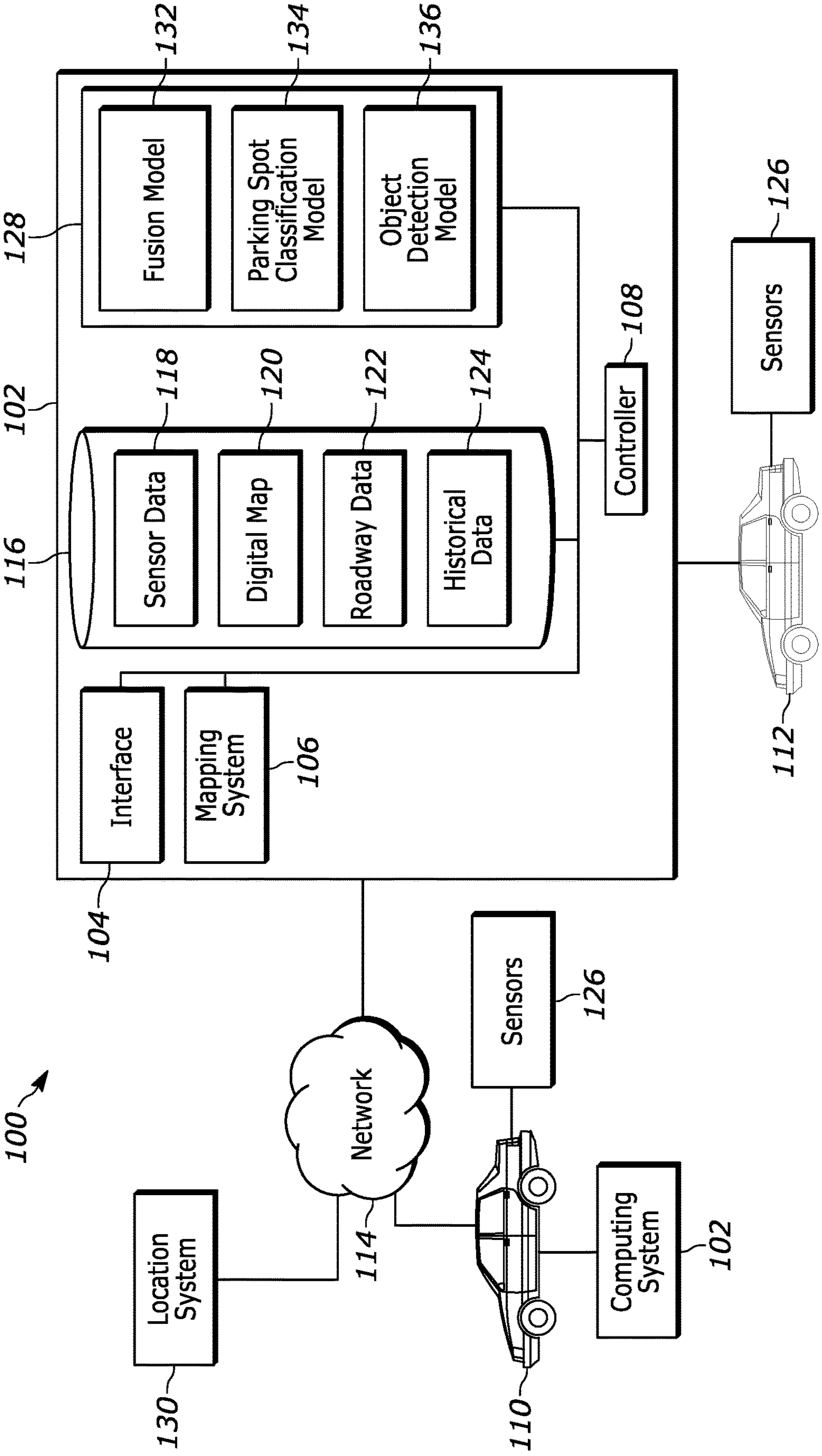
FIG. 1 illustrates a block diagram depicting an example system of mapping and localizing a parking zone using a mixed-domain neural network, according to an embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

"A", "an", and "the" as used herein refers to both singular and plural referents unless the context clearly dictates otherwise. By way of example, "a processor" programmed to perform various functions refers to one processor programmed to perform each and every function, or more than one processor collectively programmed to perform each of the various functions.

Some portions of this description describe the embodiments of the disclosure in terms of algorithms and operations. These operations are understood to be implemented by computer programs or equivalent electrical circuits, machine code, or the like, examples of which are disclosed herein. Furthermore, these arrangements of operations may be referred to as modules or units, without loss of generality. The described operations and their associated modules or units may be embodied in software, firmware, and/or hardware.

Steps, operations, or processes described may be performed or implemented with one or more hardware or software modules, alone or in combination with other devices. Although the steps, operations, or processes are described in sequence, it will be understood that in some embodiments the sequence order may differ from that which has been described, for example with certain steps, operations, or processes being omitted or performed in parallel or concurrently.

References herein to a "parking zone" should be construed to include parking lots, parking garages, streets with parking spots (e.g., parallel or angled parking spots next to a drive lane on a road), and other similar spaces where several parking spots are concentrated or grouped together. A parking zone can include a physical area that is established for parking, storing, or keeping a vehicle for a period of time. The parking zone can include one or more markers, lines, signs, or other indications to facilitate parking or define aspects of the parking zone. For example, the parking zone may or may not include parking lines that define or allocate a physical area or space in which a vehicle is to park. The parking lot can include signs that provide parking restrictions, such as types of vehicles that can park in a parking space or spot (e.g., small vehicle, mid-size vehicle, full size vehicle, sports utility vehicle, truck, hybrid, electric vehicle), requirements (e.g., handicap sticker), or time constraints (e.g., 1 hour parking, 2 hour parking).

It is nearly ubiquitous for modern vehicles to be equipped with a variety of sensors. Whether internal or external to the passenger cabin of the vehicle, these sensors provide the foundation for driving automation and vehicle autonomy. Vehicles with autonomous or semi-autonomous driving or driver-assistant features can use these sensors and associated computer vision technology to provide parking assistance. Parking assist systems can help drivers park their vehicles in parking spaces, either automatically or guiding the driver to do so. However, in order to find an available parking space in a parking zone, a vehicle typically must enter the parking zone whereupon the vehicle's sensors or the driver drives back and forth within the parking zone while visually scanning for unoccupied parking spots. This can be tedious and time-consuming, leading to frustration and unwanted fuel consumption.

Recent advancements in parking assist systems have attempted to solve this problem. One solution involves a "virtual valet" whereupon the driver can exit the vehicle and allow the vehicle to enter an autonomous, self-parking mode. In this mode, the vehicle will travel in the parking zone in search of an available parking spot. This allows the driver to save time while the vehicle parks, but still leads to unwanted fuel consumption if the vehicle must travel about the parking zone in search of an available spot.

Simultaneous localization and mapping (SLAM) is a technology a vehicle can employ for building up a map of an unknown environment or scene, or updating the map of a known environment, while at the same time calculating the vehicle's position and/or location in the environment. Visual-SLAM (VSLAM) involves using cameras as sensors to create the map and localize. Objects (e.g., other vehicles, pedestrians, lane lines, etc.) can be detected in, and extracted from, the camera images. This can be carried over to a parking zone. For example, a vehicle's camera system along with feature recognition can be used to map a parking lot via SLAM. SLAM, VSLAM, and the other similar simultaneous localization and mapping models disclosed herein can be referred to as feature detection models as they determine from the images features of the parking zone, such as parking lot lines, walls, etc.

However, vehicle SLAM systems typically rely on global positioning system (GPS) to aid in mapping and localization. When the GPS signal is weak or non-existent (such as when the vehicle is in a rural environment, or underground or in a garage), global mapping of the environment can be difficult. The mapping can be conducted with low-cost sensors, cameras and inertial measurement units (IMUs) which are not robust enough because their performance is influenced by lighting conditions and moving objects. Underground parking or parking garages are prime examples where lighting conditions are low and there are not many (if any) moving objects.

Moreover, parking area mapping techniques currently only generate 2D maps, which do not provide a solution for accurately representing 3D structures (e.g., pillars, walls, poles, etc.). Also, some parking zones have multiple floors (such as parking garages) and mapping on a purely 2D space can create problems when the vehicle is traveling over the same space in the X-Y space but on a different floor (Z-space). Without taking into account the vertical movement of the vehicle, the mapping techniques can have error.

Therefore, according to embodiments of the present disclosure, methods and systems are disclosed herein for performing mapping and localization based on a mixed-domain neural network with a two-pathway learning solution. Using vehicle cameras for example, the mapping and localization can be performed based on image data that is in an image domain (e.g., raw or only pre-processed image), and image data that is in a bird's-eye-view (BEV) domain (e.g., top-down view, projected image). A BEV can be created based on the vehicle camera images. In embodiments, the mapping and localization is also performed based on image data that is in a tri-perspective view (TPV) domain. The TPV is three-dimensional (3D) scene representation that extends beyond standard two-dimensional (2D) and BEV images by incorporating three orthogonal planes (e.g., top, side, and front views). Unlike 2D images that lack depth information and BEV representations that omit the z-axis, TPV captures fine-grained 3D structures by offering a comprehensive portrayal of a scene from multiple viewpoints, enabling a more detailed understanding while maintaining computational efficiency. The image data in the image domain, the BEV domain, and optionally the TPV domain can be integrated into the neural network for respective localization and mapping techniques.

Moreover, to account for vertical movement of the vehicle, the image data in the various domains can be compensated based on the vehicle movement. In embodiments, one or more inertial measurement units (IMUs) can output data indicating the vehicle is traveling upward or downward (for example, up or down a parking ramp), or onto a different floor. The image data can be compensated to account for this vertical movement so that mapping of multiple floors can be enabled. Also, the vertical movement data can compensate for the shape of the detected landmarks (e.g., parking spot lines) which may otherwise appear distorted in a BEV when the vehicle is traveling up a ramp, for example.

The disclosed solutions have a technical advantage relative to other parking assistance systems due to the increased range of detection considering the camera field of view and resolution. For example, BEV enables an accurate local view because the system can obtain highly localized output of the vehicle's location corresponding to the surrounding environment (e.g., parking lanes, walls, bumpers, pillars, etc.). However, the BEV domain is not as accurate for environmental objects that are further away from vehicle. In the BEV domain, because multiple (e.g., four) images are stitched together to form the BEV, images can get distorted. Therefore, in a proposed solution, objects or other image points in the image domain can be used to build a global or larger map of the parking zone, while objects or other image points in the BEV domain can be used to build a local map of the environment immediately surrounding the vehicle. This allows for the creation of a large map of a parking zone, that can also have details of localized map features from the BEV image domain.

Moreover, the disclosed solutions have a technical advantage to other parking assistance systems due to the ability to compensate for images (e.g., BEV images) that might show distortion of parking zone objects (e.g., parking lane lines) when the vehicle is traveling up or down, such as an inclined parking ramp. If left uncompensated, the parking spot lines can appear distorted due to the BEV view's inability to properly account for the fact that the lines are angled and not on a completely flat surface (e.g., on a ramp). The compensation based on IMU data can also enable the mapping of parking zones on multiple floors, as the vehicle can recognize when it has traveled to another floor based on IMU data, without the need for other sensory data such as GPS or the like.

FIG. 1 illustrates a block diagram depicting an example system 100 of mapping of, and localizing with, a parking zone using a mixed-domain neural network. The system 100 can also be used for assisting a vehicle to park based on parking-spot availability data.

The system 100 can include at least one computing system 102 for use in map generation and updating based on sensor data, stored data, and utilizing one or more machine-learning models. The computing system can include at least one interface 104, and at least one mapping system 106 for generating and updating a digital map of a parking zone, and at least one controller 108. The computing system 102 can include hardware or a combination of hardware and software, such as communications buses, circuitry, processors, communications interfaces, among others. The computing system 102 can reside on or within a corresponding vehicle (e.g., a host vehicle). For example, FIG. 1 shows a first vehicle 110 with a computing system 102 on-board, and a second vehicle 112 with another or similar computing system 102 on-board. Alternatively (or in addition), all or part of the computing system 102 can reside on a remote server (e.g., the cloud) which is communicatively coupled to the vehicles 110, 112 via a network 114. Each of the first vehicle 110 and the second vehicle 112 (or their corresponding computing system 102) can be communicatively connected to the network 114 to each other (e.g., via vehicle-to-vehicle (V2V) communication), to the cloud (e.g., via vehicle-to-cloud (V2C) communication), and/or to one or more other systems (e.g., a global positioning system (GPS), or to one or more communications devices). For example, the vehicles may include one or more transceivers configured to establish a secure communication channel with another vehicle or the remote server wirelessly using one or more communication protocols, such as, for example, communication protocol based on vehicle-to-vehicle (V2V) communications, wireless local area network (WLAN) or wireless fidelity (WiFi, e.g., any variant of IEEE 802.11 including 802.11a/b/g/n), wireless personal area network (WPAN, e.g., Bluetooth, Zigbee), cellular (e.g., LTE, 3G/4G/5G, etc.), wireless metropolitan area network WIMAN (e.g., WiMax), and other wide area network, WAN technologies (e.g., iBurst, Flash-OFDM, EV-DO, HSPA, RTT, EDGE, GPRS), dedicated short range communications (DSRC), near field communication (NFC), and the like. This enables the exchange of information and data that is described herein.

The computing system 102 can also include at least one data repository or storage 116. The data repository 116 can include or store sensor data 118 (originating from the sensors described herein), a digital map or digital map data 120, parking data 122, and historical data 124. The sensor data 118 can include information about available sensors, identifying information for the sensors, address information, internet protocol information, unique identifiers, data format, protocol used to communicate with the sensors, or a mapping of information type to sensor type or identifier. The sensor data 118 can further include or store information collected by vehicle sensors 126. The sensor data 118 can store sensor data using timestamps and date stamps. The sensor data 118 can store sensor data using location stamps. The sensor data 118 can categorize the sensor data based on a parking zone or characteristics of a parking zone.

Vehicle sensors 126 that generate the sensor data 118 can include one or more sensing elements or transducers that captures, acquires, records or converts information about its host vehicle or the host vehicle's environment into a form for processing. The sensor 126 can acquire or detect information about parking zones. The sensor 126 can detect a parking zone condition such as a road feature, boundary, intersection, lane, lane marker, or other condition. The sensor 126 can also detect a feature of a particular parking space, such as symbols that represent the parking space is for handicapped, emergency vehicles only, pregnant women (expectant mothers), and the like. The sensor 126 can, for example, acquire one or more images of the parking zone, which can be processed using image processing and object recognition to identify or detect features indicative of a parking zone, e.g., a parking sign, a stop sign, a handicap parking sign, or surface markings on a parking zone. As examples, the sensor 126 can be or include an image sensor such as a photographic sensor (e.g., camera), radar sensor, ultrasonic sensor, millimeter wave sensor, infra-red sensor, ultra-violet sensor, light detection sensor, lidar sensor, or the like. The sensor 126 can communicate sensed data, images or recording to the computing system 102 for processing, which can include filtering, noise reduction, image enhancement, etc., followed by object recognition, feature detection, segmentation processes, and the like. The raw data originating from the sensors 126 as well as the processed data by the computing system 102 can be referred to as sensor data 118 or image data that is sensed by an associated sensor 126.

The sensors 126 can include panoramic cameras, pinhole cameras, or the like that are mounted to a vehicle. The images generated from these cameras can be in various domains, such as an image domain (also referred to as a raw image), or a BEV domain (also referred to as a top-down view or a projected image). Images stitched together to form the BEV image can also be subjected to neural network processing (e.g., feature detection) as part of the BEV domain processing.

The sensor 126 can also include a global positioning system (GPS) device that can determine a location of the host vehicle relative to an intersection, using map data with an indication of the parking zone. The GPS device can communicate with location system 130, described further below. The computing system 102 can use the GPS device and the map data to determine that the host vehicle (e.g., first vehicle 110) has reached the parking zone. The computing system 102 can use the GPS device and the map data to determine the boundaries of the parking zone. The sensor 126 can also detect (e.g., using motion sensing, imaging or any of the other sensing capabilities described herein) whether any other vehicle or object is present at or approaching the parking zone, and can track any such vehicle or object's position or movement over time for instance. The sensor 126 can also detect the relative position between another vehicle and a parking spot, e.g., whether or not a parking spot is occupied by a vehicle as indicated by at least a portion of the vehicle being between the boundaries of two adjacent parking spot lines. However, the mapping and localization techniques disclosed herein can be performed without GPS data.

The sensor 126 can also include an inertial measurement unit (IMU). The IMU can be a 6-degree-of-freedom (6 DoF) sensor that can measure movements and orientations in three-dimensional space along six different axes. These axes can include three axes for linear motion (X, Y, Z) and three axes for rotational movement or orientation (pitch, yaw, roll) of the vehicle 110. The 6 Dof sensor can include an accelerometer, gyroscope, magnetometer, or combination of these sensors to capture movements and orientations in multiple axes within a three-dimensional space. The IMU can also be a 9-degree-of-freedom (9 DoF) sensor that can also measure the vehicle's motion and orientation in three-dimensional space. Compared to a 6 DoF sensor, a 9 DoF sensor provides additional capabilities of combining all three of an accelerometer, gyroscope, and magnetometer. Incorporating a magnetometer allows for tracking of the vehicle's linear motion, rotational movement, and orientation relative to the Earth's magnetic field. Tracking the vehicle's vertical movement based on the IMU can allow the system to infer that the vehicle has traveled to another vertical floor of a parking garage, for example, without the need for relying on other systems for that determination, such as GPS.

Using any one or more of the aforementioned types of sensors 126, the vehicle (e.g., first vehicle 110) is able to virtually map the parking zone. For example, the sensors calculate relatives distances between detected objects and the sensor itself, and the computing system 102 can utilize a visual simultaneous localization and mapping (SLAM) system. Visual SLAM is a position detecting scheme in which a process of generating a digital map of an environment (such as a parking zone) and a process of acquiring a location of the sensor or vehicle itself are complementarily performed. In other words, characteristics of the environment about the vehicle as well as the location of the vehicle itself are determined simultaneously.

The mapping system 106 can implement visual SLAM (or similar technologies) to generate a digital map of the parking zone. The mapping system 106 is designed, constructed or operational to generate digital map data based on the data sensed by the one or more sensors 126. The digital map data structure (or referred to as digital map 120) can generate the digital map from, with or using one or more machine learning models or neural networks established, maintained, tuned, or otherwise provided via one or more machine learning models 128. The machine learning models 128 can be configured, stored, or established on the computing system 102 of the first vehicle 110, or on a remote server. The mapping system 106 can detect, from a first neural network and based on the data sensed by the one or more sensors 126, objects located at the parking lot. The mapping system 106 can perform, using the first neural network and based on the data sensed by the one or more sensors 126, scene segmentation. The mapping system 106 can determine, using the first neural network and based on the data sensed by the one or more sensors 126, depth information for the parking zone. The mapping system 106 can identify, from the first neural network 114 and based on the data sensed by the one or more sensors 126, one or more parking lines or parking spots in the parking zone. The mapping system 106 can construct the digital map based on the detected objects located at the parking zone, the scene segmentation, the depth information for the parking zone, and the one or more parking lines at the parking zone.

The mapping system 106 can create the digital map 120 based on the sensor data 118. This digital map 120 can be created via implemented visual SLAM, as described above. In one embodiment, the digital map 120 can include three dimensions on an x-y-z coordinate plate, and associated dimensions can include latitude, longitude, and range, for example. The digital map 120 can be updated periodically or reflect or indicate a motion, movement or change in one or more objects detected in the parking zone. For example, the digital map can include stationary objects associated with the scene, such as a curb, tree, lines, parking signs, or boundary of the parking zone, as well as non-stationary objects such as vehicles moving or a person moving (e.g., walking, biking, or running).

Various types of machine learning models 128 are disclosed herein. The machine learning model utilized by the mapping system 106 to generate the digital map 120 can include any type of neural network, including, for example, a convolution neural network, deep convolution network, a feed forward neural network, a deep feed forward neural network, a radial basis function neural network, a Kohonen self-organizing neural network, a recurrent neural network, a modular neural network, a long/short term memory neural network, or the like. Each machine learning model 128 can maintain, manage, store, update, tune, or configure one or more neural networks and can use different parameters, weights, training sets, or configurations for each of the neural networks to allow the neural networks to efficiently and accurately process a type of input and generate a type of output.

One or more of the disclosed machine learning models 128 disclosed herein can be configured as or include a convolution neural network. The convolution neural network (CNN) can include one or more convolution cells (or pooling layers) and kernels, that can each serve a different purpose. The convolution kernel can process input data, and the pooling layers can simplify the data, using, for example, non-linear functions such as a max, thereby reducing unnecessary features. The CNN can facilitate image recognition. For example, the sensed input data can be passed to convolution layers that form a funnel, compressing detected features. The first layer can detect first characteristics, the second layer can detect second characteristics, and so on.

The convolution neural network can be a type of deep, feed-forward artificial neural network configured to analyze visual imagery. The convolution neural network can include multilayer perceptrons designed to use minimal preprocessing. The convolution neural network can include or be referred to as shift invariant or space invariant artificial neural networks, based on their shared-weights architecture and translation invariance characteristics. Since convolution neural networks can use relatively less pre-processing compared to other image classification algorithms, the convolution neural network can automatically learn the filters that may be hand-engineered for other image classification algorithms, thereby improving the efficiency associated with configuring, establishing or setting up the neural network, thereby providing a technical advantage relative to other image classification techniques.

One or more of the disclosed machine learning models 128 disclosed herein can include a CNN having an input layer and an output layer, and one or more hidden layers that can include convolution layers, pooling layers, fully connected layers, or normalization layers. The one or more pooling layers can include local pooling layers or global pooling layers. The pooling layers can combine the outputs of neuron clusters at one layer into a single neuron in the next layer. For example, max pooling can use the maximum value from each of a cluster of neurons at the prior layer. Another example is average pooling, which can use the average value from each of a cluster of neurons at the prior layer. The fully connected layers can connect every neuron in one layer to every neuron in another layer.

To assist in generating the digital map 120, the computing system 102 can interface or communicate with a location system 130 via network 114. The location system 130 can determine and communicate the location of one or more of the vehicles 110, 112 during the performance of the SLAM or similar mapping techniques executed in generating the digital map 120. The location system 130 can include any device based on a positioning system such as Global Navigation Satellite System (GNSS), which can include GPS, GLONASS, Galileo, Beidou and/or other regional systems. The location system 130 can include one or more cellular towers to provide triangulation. The location system 130 can include wireless beacons, such as near field communication beacons, short-range wireless beacons (e.g., Bluetooth beacons), or Wi-Fi modules.

The computing system 102 can be configured to utilize interface 104 to receive and transmit information. The interface 104 can receive and transmit information using one or more protocols, such as a network protocol. The interface 104 can include a hardware interface, software interface, wired interface, or wireless interface. The interface 104 can facilitate translating or formatting data from one format to another format. For example, the interface 104 can include an application programming interface that includes definitions for communicating between various components, such as software components. The interface 104 can be designed, constructed or operational to communicate with one or more sensors 126 to collect or receive information, e.g., image data. The interface 104 can be designed, constructed or operational to communicate with the controller 108 to provide commands or instructions to control a vehicle, such as the first vehicle 110. Such commands can be, for example, autonomous driving or parking commands, such as acceleration, deceleration, steering, and the like to enable an autonomous driving or autonomous parking event to occur. The information collected from the one or more sensors can be stored as shown by sensor data 118.

The interface 104 can receive the image data sensed by the one or more sensors 126 regarding an environment or characteristics of a parking zone. The sensed data received from the sensors 126 can include data detected, obtained, sensed, collected, or otherwise identified by the sensors 126. As explained above, the sensors 126 can be one or more various types of sensors, and therefore the data received by the interface 104 for processing can be data from a camera, data from an infrared camera, lidar data, laser-based sensor data, radar data, transducer data, or ultrasonic sensor data. Because this data can, when processed, enable information about the parking zone to be visualized, this data can be referred to as image data.

The data sensed from the sensors 126 can be received by interface 104 and delivered to mapping system 106 for detecting various qualities or characteristics of a parking zone (e.g., parking lines, handicapped spaces, etc.) as explained above utilizing techniques such as segmentation, CNNs, or other machine learning models. For example, the mapping system 106 can rely on one or more neural networks or machine learning models 128 to detect objects, scene segmentation, roads, terrain, trees, curbs, obstacles, depth or range of the parking lot, parking line detection, parking marker detection, parking signs, or other objects at or associated with the parking zone. The computing system 102 can train the machine learning models 128 using historical data 124. This training can be performed remote from a computing process 102 installed on a vehicle 110, 112. In other words, the computing system 102 may be on a remote server for at least these purposes. Once trained, the models can be communicated to or loaded onto the vehicles 110, 112 via network 114 for execution.

Once generated, the digital map 120 can be stored in storage 116 and accessed by other vehicles. For example, the computing system 102 of a first vehicle 110 may be utilized to at least in part generate the digital map 120, whereupon that digital map 120 can be accessed by the computing system 102 of a second vehicle 112 that subsequently enters the parking zone. The computing system 102 of the second vehicle 112 (and other vehicles) can be utilized to update the digital map 120 in real-time based upon more reliable data captured form the second vehicle 112. In addition, the computing system 102 of both vehicles 110, 112 can be used to generate and continuously update parking data 122 in real-time. The parking data 122 represents data indicating characteristics of particular parking spots. For example, the parking data 122 can include a location of one or more parking spots, whether or not those parking spots are occupied or not occupied by a vehicle, and whether one or more of the parking spots are reserved for handicapped individuals, emergency vehicles only, vehicles carrying pregnant mothers, and the like, as described above. These qualities of the individual parking spots can be determined via the image data received from sensors 126 either when the digital map is generated, and/or when the digital map is updated by a second vehicle 112 or other vehicles. By updating the parking data 122 in real-time, a subsequent vehicle that enters the parking zone can be provided with live, accurate information about, for example, which parking spots are occupied or unoccupied.

As described above, one or more machine learning models 128 can be relied upon to perform the various functions described herein. These machine learning models 128 can include a fusion model 132, a parking spot classification model 134, an object detection model 136, and other models. The fusion model 132 is trained and configured to receive and fuse the image data 118, the digital map 120, and the parking data 122 and perform object detection and classification as described above, the results of which can be input into the parking spot classification model 134, for example. This can be executed with image data residing in the image domain and the BEV domain.

The parking spot classification model 134 is trained and configured to, based on the above data, perform image classification (e.g., segmentation) to generate and update parking data relating to the parking spaces of the parking zone. For example, the parking spot classification model 134 can be a machine learning model that determines whether each parking spot is a normal parking spot, a handicapped parking spot, a charging station for an electric vehicle (and, for example, whether that charging station is for wireless charging or charging by cable), and/or whether each parking spot has an allowed duration of parking (e.g., 1 hour, 2 hours, etc.). The output of this parking spot classification model 134 can be used to update the digital map 120 and parking data 122 if necessary.

The objection detection model 136 is trained and configured to, based on the above data, detect objects or obstacles in the parking zone. This can include parking lines used to determine whether a parking spot is present. The objection detection model 136 can, for example, determine the presence of a vehicle in a parking spot, thus enabling a determination that a parking spot is occupied. The objection detection model 136 can also determine the presence of a pothole, cone, debris, or other object in the parking zone, which can be stored in storage 116 and communicated to other vehicles (e.g., vehicle 112) that subsequently enter the parking zone.

Figure 2:
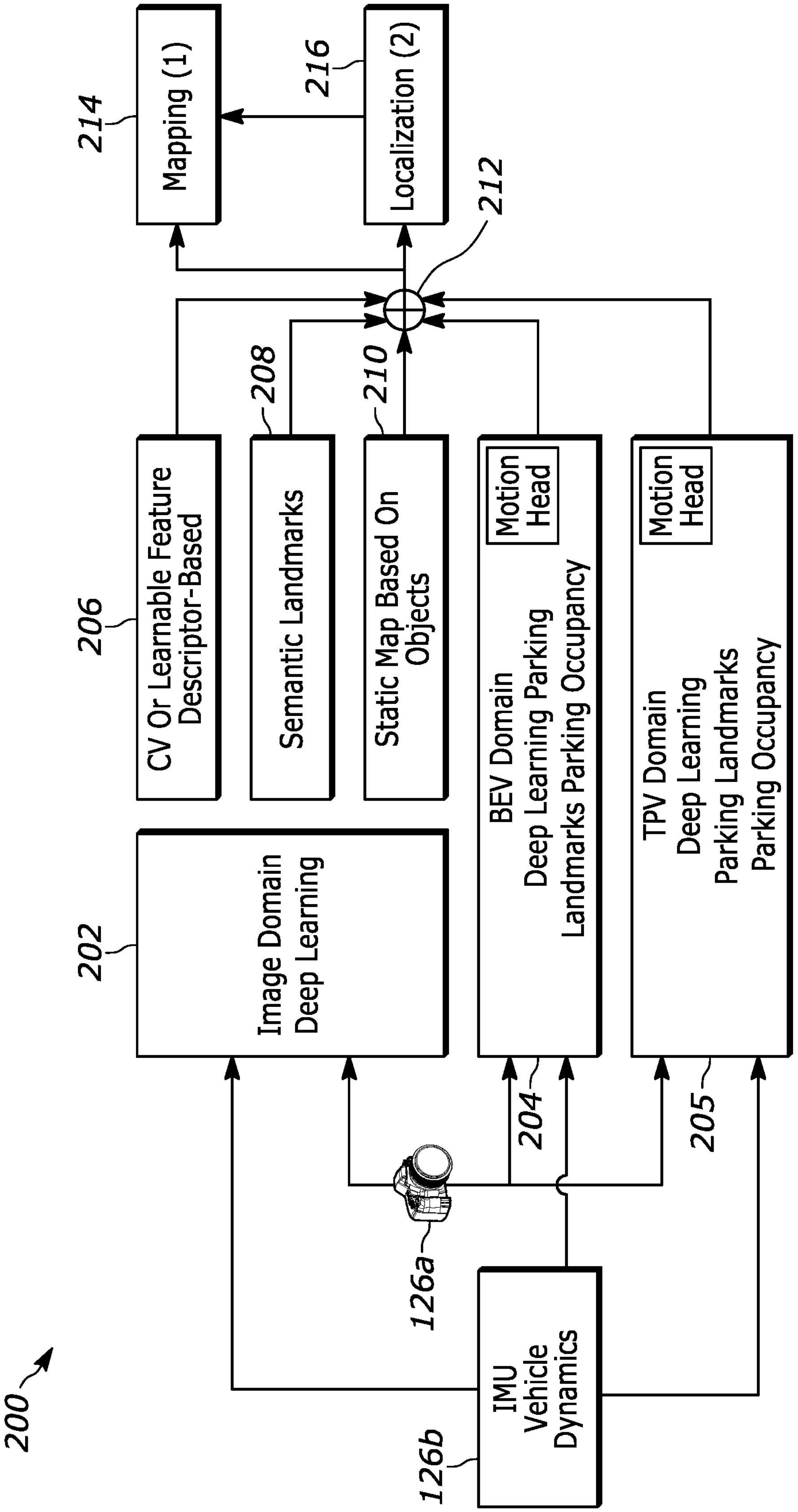
FIG. 2 illustrates an example operational diagram for implementing the system of FIG. 1, according to an embodiment.

FIG. 2 illustrates an example operational diagram 200 for implementing the system of FIG. 1, according to an embodiment. This operational diagram can be for a system of simultaneously localizing and mapping based on a mixed-domain neural network. The various operations illustrated here can be performed by one or more system, component, or function depicted in FIG. 1. For example, the operations can be performed by computing system 102, mapping system 106, controller 108, and the various machine learning models 128 disclosed above. At 202, image-domain deep learning is performed wherein image data in the image domain (e.g., raw image, preprocessed, not significantly modified) is received from a sensor 126, in this case a camera 126*a* such as a fisheye camera or pinhole camera mounted on a vehicle. Additionally, data from another sensor 126, namely an IMU 126*b*, can be provided for compensation described further herein.

The image data generated from the sensor 126 can also be used to create a bird's-eye-view (BEV) image with associated data that is in the BEV domain 204. In an embodiment, the BEV is formed by stitching together multiple camera images, and distorting those images to appear as if a virtual camera is positioned above the vehicle looking down on the vehicle and its surroundings.

The image data in the image domain 202 can be processed with a computer vision (CV) machine learning model 206 implementing feature-based descriptors. In an embodiment, the CV model 206 utilizes an Oriented FAST and rotated BRIEF (ORB) version of SLAM, or ORB-SLAM. ORB-SLAM is a computer vision-based system using ORB features whose descriptor provides short-term and mid-term data association, builds a covisibility graph to limit the complexity of tracking and mapping, and performs loop closing and relocalization, achieving long-term data association.

In another embodiment, the CV model 206 utilizes a Learned Invariant Feature Transform (LIFT) version of SLAM, or LIFT-SLAM. LIFT-SLAM is a deep-learning feature-based monocular VSLAM system that reconstructs sparse maps that are graph-based and keyframe-based, allowing the performance of bundle adjustment to optimize the estimated poses of the cameras. LIFT is a deep neural network (DNN) that implements local feature detection, orientation estimation, and description in a supervised end-to-end approach in which three main modules based on CNNs are used: detector, orientation estimator, and descriptor. The LIFT algorithm works with patches of images; after giving a patch as input, the detector network provides a score map of this patch. A soft argmax operation is performed over this score map to return the potential feature point location. Then, the algorithm performs a crop operation centered on the feature location, used as input to the orientation estimator which predicts an orientation to the patch. Thus, a rotation is applied in the patch according to the estimated orientation. The descriptor network computes a feature vector from the rotated patch, which is the output.

In another embodiment, the CV model 206 relies upon parts of an autonomous valet parking (AVP) SLAM, or AVP-SLAM. AVP-SLAM incorporates semantic features (e.g., guide signs, parking lines, speed bumps, etc.) which typically appear in parking zones. These semantic features are exploited to build the map and localize the vehicle in the parking zone. Compared with traditional features, these semantic features are long-term stable and robust to the perspective and illumination change.

Building upon this system, semantic landmarks are extracted from the image-domain data at 208. In one example, at 208 the image-domain data can be processed with a CNN configured for semantic segmentation, i.e. pixel-wise labeling of the image. For example, DeepLab, S-Unet, or other semantic segmentation models can be used. Here, various semantic landmarks that are mostly long-term and stable within a parking zone can be identified. Examples of such semantic landmarks labeled can include parking lanes, parking spot lines, walls, bumpers, pillars, road markers, signs, arrows, and the like.

The image-domain data can also be processed to generate a static map at 210. Here, an object detection model can detect static objects such as trees, poles, curbs, borders, cones, parked cars, and the like. The static map can consume some information of semantic landmarks. Poles, curbs, and the like are static objects (as opposed to dynamic objects) that do not change position from one iteration to another, and also help identify landmarks within the map used for parking purposes. These objects are therefore good candidates for digestible information for the generation of a static map.

Meanwhile, the BEV-domain image data is processed at 204. Parking landmarks can be determined based on the BEV-domain image data. For example, parking lines, vehicle orientation, drivable areas, and parking occupancy (i.e., the detection of another vehicle in a parking spot) can be determined based on the BEV-domain image data. Neural network(s) can process the image data from a fusion of fisheye and pinhole cameras, for example. BEV semantic segmentation can be utilized to take camera views as input and predict a rasterized map with surrounding semantics under the BEV view. Depth estimation can be included, injected with auxiliary 3D information. This can be performed via local self-similarity (LSS), SimpleBEV, BEVFusion, LaRa, BEVDet, or the like. Centroidal Voronoi tessellation (CVT) can also be utilized, which develops positional embeddings for each individual camera depending on its intrinsic and extrinsic calibrations. BEVFormer can also be used, which exploits the camera intrinsic and extrinsic explicitly to compute the spatial features in the regions of interest of the BEV grid across camera views using deformable transfer.

IMU data is also provided from the IMU sensor 126*b* for compensating the BEV-domain data at 204, as will be described herein. This allows the BEV models to have an associated motion head which accounts for the motion data associated with the vehicle. For example, if the IMU sensor 126*b* generates data indicating the vehicle is angled upward or downward at a particular angle, it can adjust or compensate various items shown in the BEV image and its associated data. For instance, as will be shown in FIG. 3, parking lane lines may be distorted in a pure BEV image without compensation due to the vehicle's incline; this can be accounted for based on the IMU data.

The raw images and image data from the cameras 126*a* can also be used to create a tri-perspective view (TPV) at 205. TPV is described in TRI-PERSPECTIVE VIEW FOR VISION-BASED 3D SEMANTIC OCCUPANCY PREDICTION, HUANG ET AL. 2023 (hereinafter "Huang"). In general, the TPV representation accompanies the BEV with two additional perpendicular planes to create three cross-planes representing top, side, and front views. This comprehensive representation aims to capture fine-grained 3D structures efficiently. In generating a TPV, point querying formulation can be utilized in which the TPV aggregates projections of a point on the top, side, and front views, using bilinear interpolation and summation to generate a comprehensive feature for each point in the 3D space. Voxel feature formation allows the TPV to construct a 3D feature space similar to voxels but with lower storage and computation complexity. It diversifies point features along orthogonal directions, which BEV representation ignores. A transformer-based TPV encoder, TPVFormer, lifts image features to TPV planes through attention mechanisms. It employs TPV queries, image cross-attention (ICA), and cross-view hybrid attention (CVHA) for effective generation of TPV planes.

In more detail, the TPVFormer is a transformer-based encoder specifically designed to transform image features into Tri-Perspective View (TPV) representations. It facilitates the conversion of 2D image information into the TPV space, which encompasses three orthogonal views (top, side, and front) of a 3D scene. TPVFormer employs TPV queries, which are essentially feature vectors representing grid cells within the three TPV planes. These queries serve as the basis for encoding view-specific information from the corresponding regions in the scene. Image cross-attention (ICA) is utilized within TPVFormer to lift multi-scale and possibly multi-camera image features to the TPV planes. Considering the high-resolution nature of TPV queries and multiple image feature maps, it implements efficient deformable attention mechanisms to handle the interactions between image features and TPV queries. The CVHA attention mechanism enables direct interactions among TPV queries from the same or different views. It allows queries to exchange information across different views, aiding in context extraction. Similar to image cross-attention, deformable attention is employed here to reduce computational complexity. TPVFormer is structured using transformer blocks, such as hybrid-cross-attention blocks (HCAB) and hybrid-attention blocks (HAB). HCAB combines both cross-view hybrid-attention and image cross-attention, effectively querying visual information from image features. On the other hand, HAB focuses solely on contextual information encoding. TPVFormer's architecture involves stacking multiple HCAB and HAB blocks to process and transform the image features into TPV representations effectively.

In general, the TPV process involves enhancing TPV queries with raw visual information from image features in HCAB blocks and refining them with contextual clues from other queries in HAB blocks. Additionally, TPVFormer utilizes deformable attention mechanisms to efficiently handle the interactions and information exchange between image features and TPV queries. Overall, TPVFormer acts as a transformer-based encoder that enables the transformation of 2D image information into the TPV space, ultimately facilitating a comprehensive understanding of the 3D scene from different perspectives.

Once again, vehicle motion data from the IMU(s) 126*b* can be incorporated to the TPV data at 205. In short, the TPV image or accompanying data can be modified or compensated based on the IMU data as will be described. This allows the TPV models to have an associated motion head which accounts for the motion data associated with the vehicle.

At 212, a feature integration module is utilized to integrate the image-domain image data, the BEV-domain image data, and the TPV-domain data. Here, in embodiments, the features in the BEV-domain image data, the image-domain image data, and the TPV-domain data are used together for tracking and pose estimation, and generating the trajectory based on the poses and tracking. The features are transferred from vehicle coordinates into the world coordinates in order to generate local maps. If two local maps match successfully, the relative pose between the two local maps is obtained. Globally-consistent maps are generated by stacking local maps together by updating poses after global pose graph optimization. In the global pose graph optimization, there can be loop closure and odometry constrains to handle the drive of the mapping. Thus, BEV domain mapping and image domain mapping are combined.

With the integrated image-domain image data, the BEV-domain image data, and the TPV-domain data, a SLAM algorithm or process can be utilized. In particular, mapping can be performed at 214 according to the examples and descriptions provided above. Here, a map of the parking zone is generated (or updated) based upon the detected objects and processing of the image-domain image data and the BEV-domain image data. Simultaneously, localization can be performed at 216 based on the same. The localization data can also be used for the mapping. Both the localization 216 and mapping 214 can be implemented using the mapping system 106 described above, such as a SLAM system for example.

In both mapping 214 and localization 216, image data can be relied upon without the need for GPS or other sensors. The lack of GPS can be due to the vehicle being within the parking zone which blocks or interferes with the GPS signal. However, the present disclosure is not limited to such. Indeed, additional sensors (e.g., lidar, radar, IMU, GPS) can be utilized to further improve the mapping and/or localization.

Figure 3:
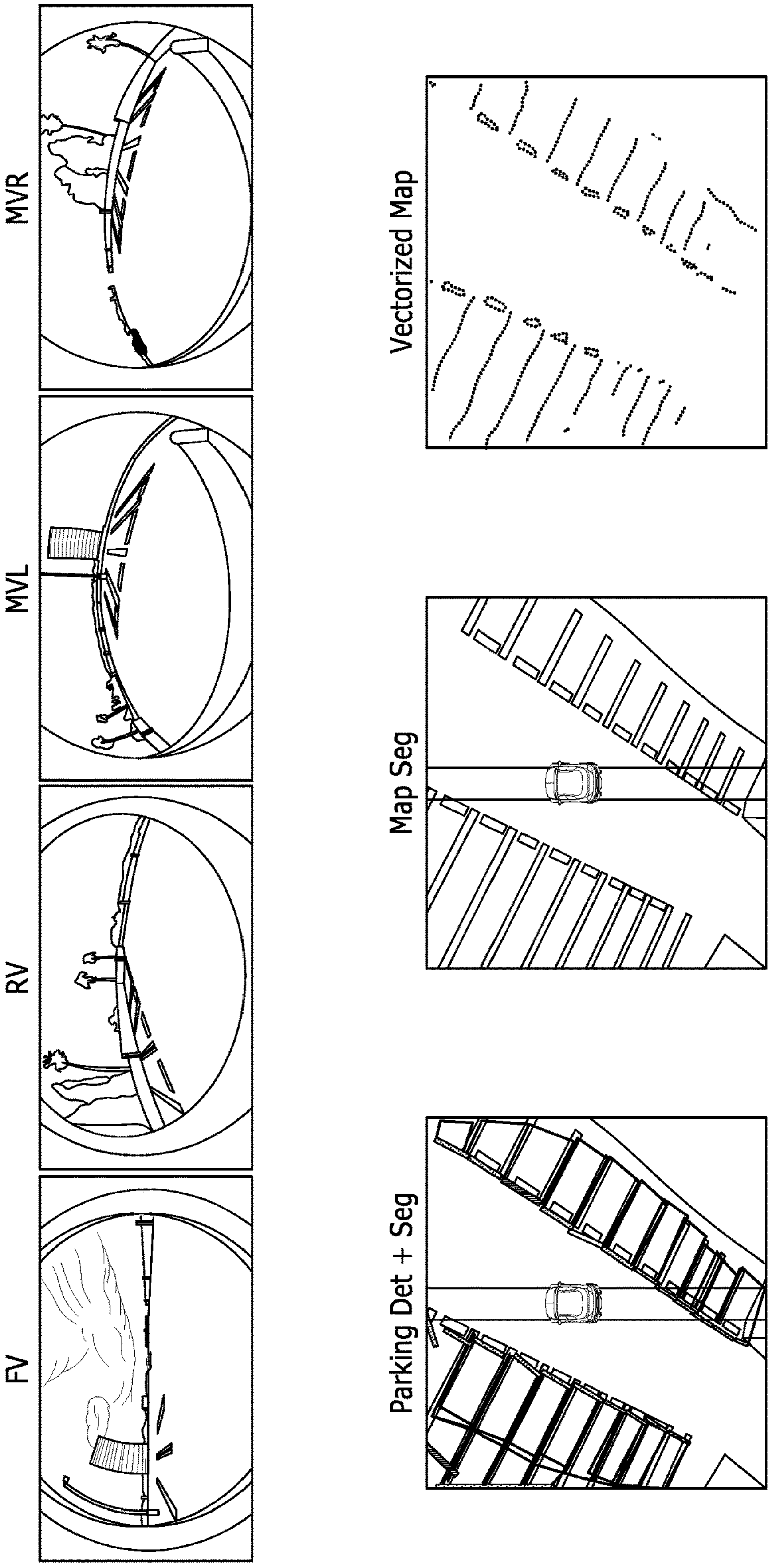
FIG. 3 illustrates various images taken from vehicle cameras that ultimate lead to the generation of a bird's-eye-view (BEV) and segmentation of parking landmarks in the image data, according to an embodiment.

FIG. 3 illustrates how IMU data can be used to compensate the image data (e.g., either image-domain data, BEV-domain data, and/or TPV-domain data). In this illustrated embodiment, the BEV image is compensated. Images are taken from four different vehicles cameras, namely a front view (FV) camera, a rear view (RV) camera, a middle view left (MVL) camera, and a middle view right (MVR) camera. The images are transformed and stitched together to form a single BEV image, as described above. The BEV-domain data can be relied upon for segmentation, shown generally where parking spot lines have been identified and colored. For example, segmentation can identify individual parking space lines 302 and an associated parking space 304. Segmentation can also identify the entryway into each parking spot, shown by the lines 306. In this instance in which the images are taken, the vehicle is traveling up a parking ramp. This causes a distortion in the BEV image, namely with the parking space lines. As can be seen in the images, the parking lines are not equal in length, and the lines 306 on either side of the vehicle are not parallel. (The lines 306 indicating the entry to the parking spots appear to diverge away from one another as they go in the upper right direction.) In reality, these lines 306 are parallel, but the inclination of the vehicle makes them not parallel due to the angle of the ramp.

The IMU data can compensate this. For example, the IMU data can indicate the vehicle is traveling upward or downward. The system can be calibrated to adjust parking semantic markings such as the parking space lines 302 and/or the lines 306 accordingly. As the ramp angle increase, so too can the calibration. The models used to create these lines (e.g., through segmentation) can be trained so as to properly calibrate the lines so that they appear more true to actuality.

Although now shown, this type of calibration can also be used in the TPV-domain data.

Figure 4:
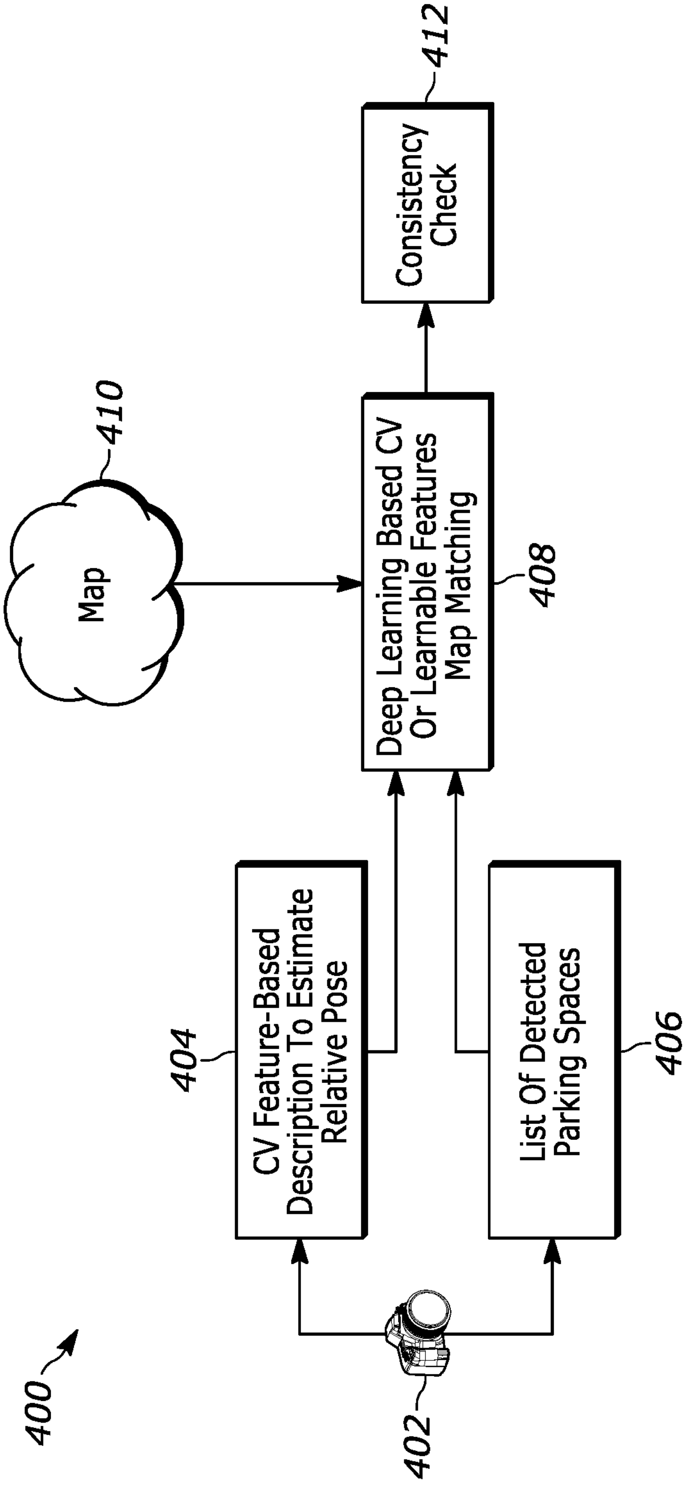
FIG. 4 illustrates an example operational diagram for implementing the system of FIG. 1, according to an embodiment.

FIG. 4 illustrates an example operational diagram 400 for implementing the system of FIG. 1, according to an embodiment. Once again, the various operations illustrated here can be performed by one or more system, component, or function depicted in FIG. 1. For example, the operations can be performed by computing system 102, mapping system 106, controller 108, and the various machine learning models 128 disclosed above. At 402, the system (e.g., system 100) receives image data. The image data may be BEV-domain data associated with a BEV image, which can be generated according to the teachings above. For example, the BEV image and BEV-domain data at 402 may be generated from the raw image data. The image data may also be in the TPV-domain associated with a TPV image, which can be generated according to the teachings above. For example, the TPV image and TPV-domain data at 402 may be generated from the raw image data.

At 404, the system can implement the CV machine learning model similar to 206 described above. Here, feature-based descriptions are generated to estimate a relative pose of the vehicle and/or its surroundings. This can be performed in real-time while the vehicle is in the parking zone. Further, at 406, the system can generate a list of detected parking spaces or slots. This can be based on the determined presence of parking lines with no vehicle located between the parking lines, for example, based on the BEV-domain image data and/or TPV-domain data.

At 408, the system can perform deep learning-based CV or learnable features map matching. This can be executed based on both the feature-based description from 404 and the list of detected available parking spaces or slots from 406, along with a map or map data 410. The map or map data 410 may be generated from a previous vehicle that traveled through the parking zone, for example. One example of a machine learning model implemented at 408 is DelS-3D, a Deep Localization and Segmentation with a 3D Semantic Map. Further, the system can implement loop detection to identify places that were previously visited by that vehicle or another vehicle, and perform loop closure to align the current scan to the previously visited place and accordingly correct the map. A loop closure detection such as LCDNet can be implemented to reduce the drift accumulated over time by adding a new constraint to the pose graph when a loop is detected. Consistency between the previously-generated scan with the currently-generated scan is thus performed at 412.

Figure 5A:
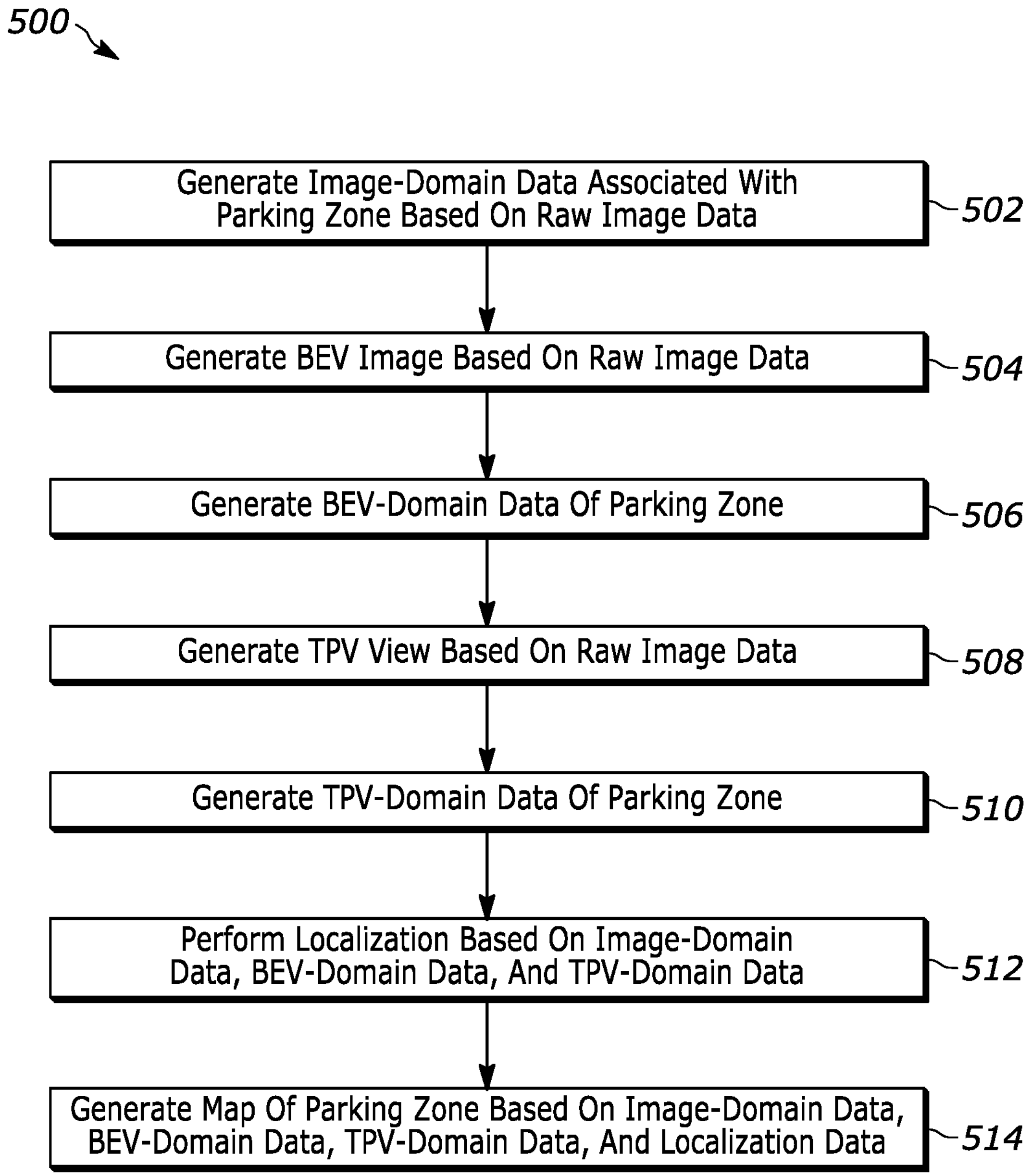
FIGS. 5A-5B illustrate flow diagrams of example methods of mapping and localizing a parking zone using mixed-domain neural networks, according to an embodiment.

FIG. 5A illustrates a flow diagram of an example method 500 of mapping and localizing a parking zone using mixed-domain neural networks, according to an embodiment. The method may be performed via the computing system 100 described herein, for example. At 502, one or more processors of the computing system generates image-domain data associated with a parking zone based on raw image data. The raw image data can be received from a plurality of sensors 126, such as cameras, mounted about the vehicle. The image-domain data can be generated by a feature-detection machine learning model, such as those described herein. For example, an object-recognition, feature-detection, or the like can be utilized to determine the presence and location of a pillar, parking lane line, or other parking zone object described herein.

At 504, one or more processors of the computing system generates a bird's-eye-view (BEV) image based on the raw image data from 502. The BEV image may be a projected image of the parking zone, and may be generated by stitching together multiple images from a respective number of cameras. At 506, the one or more processors generate corresponding BEV-domain data associated with the BEV image from 504. The BEV-domain data includes data associated with parking landmarks in the parking zone, such as poles, pillars, parking lines, and those explained above.

At 508, one or more processors of the computing system generates a tri-perspective view (TPV) image based on the raw image data from 502. The TPV image may also be a projected image of the parking zone, and is 3D scene representation that extends beyond standard 2D and BEV images by incorporating three orthogonal planes (e.g., top, side, and front views), as explained above. At 510, the one or more processors generate corresponding TPV-domain data associated with the TPV image from 508. The TPV-domain data includes data associated with the parking landmarks in the parking zone.

At 512, the computing system performs a localization of the vehicle within the parking zone based on the BEV-domain data, the image-domain data, and the TPV-domain data in order to generate localization data. At 514, which may be performed simultaneously with 512, the computing system can perform a mapping of the parking zone based on the BEV-domain data, the image-domain data, the TPV-domain data, and the localization data. The mapping can result in a digitally-generated map of the parking zone, the data of which can be transferred to a remote server for updating of a server-stored map.

Figure 5B:
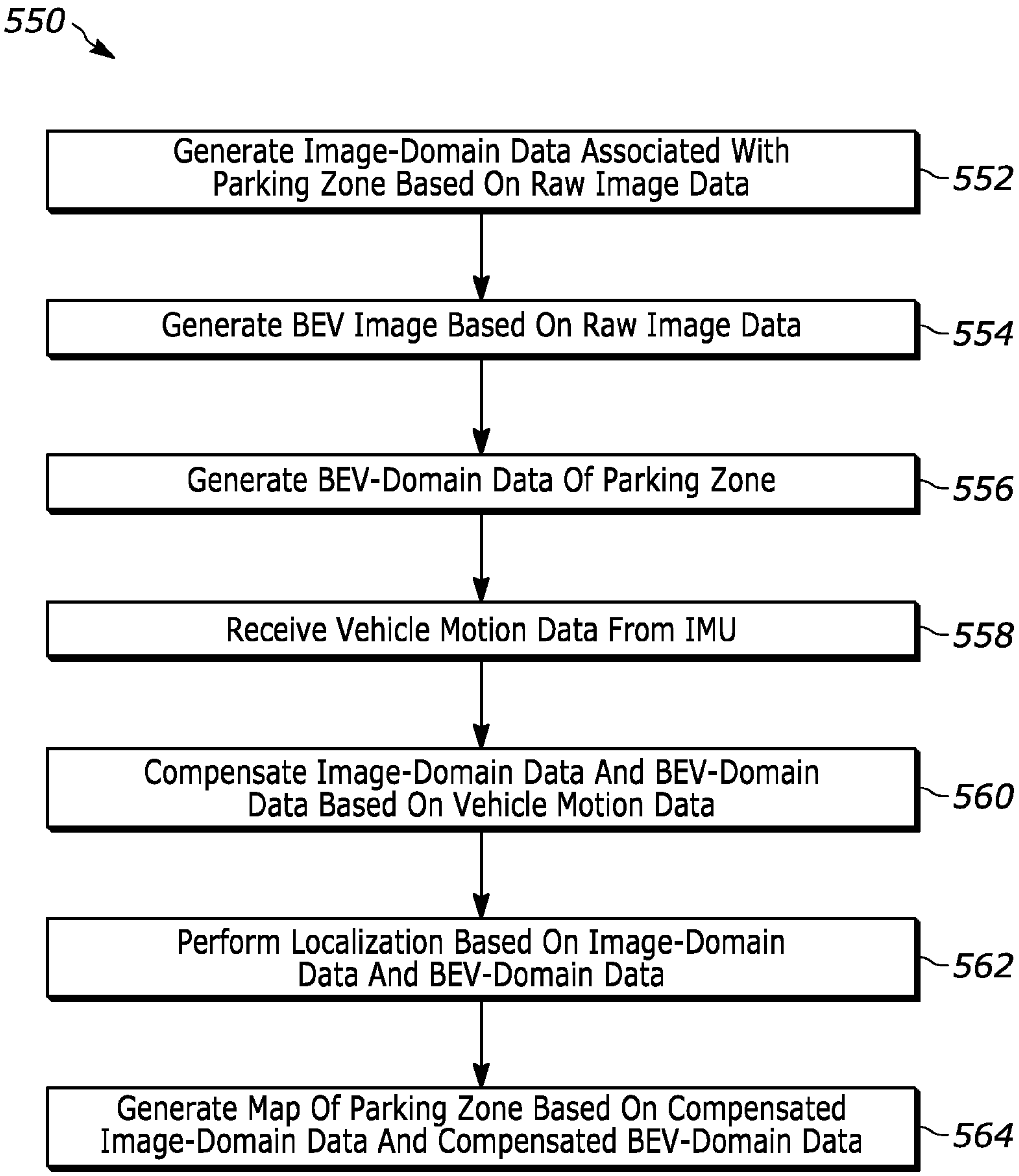

FIG. 5B illustrates a flow diagram of an example method 550 of mapping and localizing a parking zone using mixed-domain neural networks, according to another embodiment. Steps 552-556 are similar to steps 502-506 and therefore are not described again in the interest of brevity.

At 558, one or more IMUs generates vehicle movement data which is received by one or more processors of the computing system. The IMU(s) can be 6 DoF or 9 DoF sensors. The data from these sensors when measured and tracked/saved over time can allow the computing system to determine if the vehicle is traveling up or down an incline, such as a ramp of a parking garage. This can allow for compensation of the detected objects in those areas where the vehicle is located on an incline or decline, as described above. At 560, the computing system compensates the image-domain data and BEV-domain data based on the vehicle motion data. Optionally, if TPV-domain data is also generated, the IMU data can be used to compensate the TPV-domain data.

The IMU data also allows for the computing system to map multiple floors. For example, if the tracked movement data indicates that the vehicle has been traveling uphill (but not downhill) and has been circling around an area and arrives at the same location on an x-y plane, it can be inferred that the vehicle has traveled up to another location on the z-plane (e.g., another floor of the parking garage). Therefore, mapping of that floor can take place and not interfere with the mapping from the previous floor. The movement data can allow the computing system to infer the vehicle's movement from one floor to another, which allows mapping of multiple floors. Without knowing if the vehicle is on a different floor, the computing system might otherwise re-map the same area again assuming it is on the same floor, even though it is not.

At 562, the computing system performs a localization of the vehicle within the parking zone based on the BEV-domain data and the image-domain data in order to generate localization data. At 564, which may be performed simultaneously with 562, the computing system can perform a mapping of the parking zone based on the compensated BEV-domain data, the compensated image-domain data, and the localization data. The mapping can result in a digitally-generated map of the parking zone, the data of which can be transferred to a remote server for updating of a server-stored map.

Figure 6:
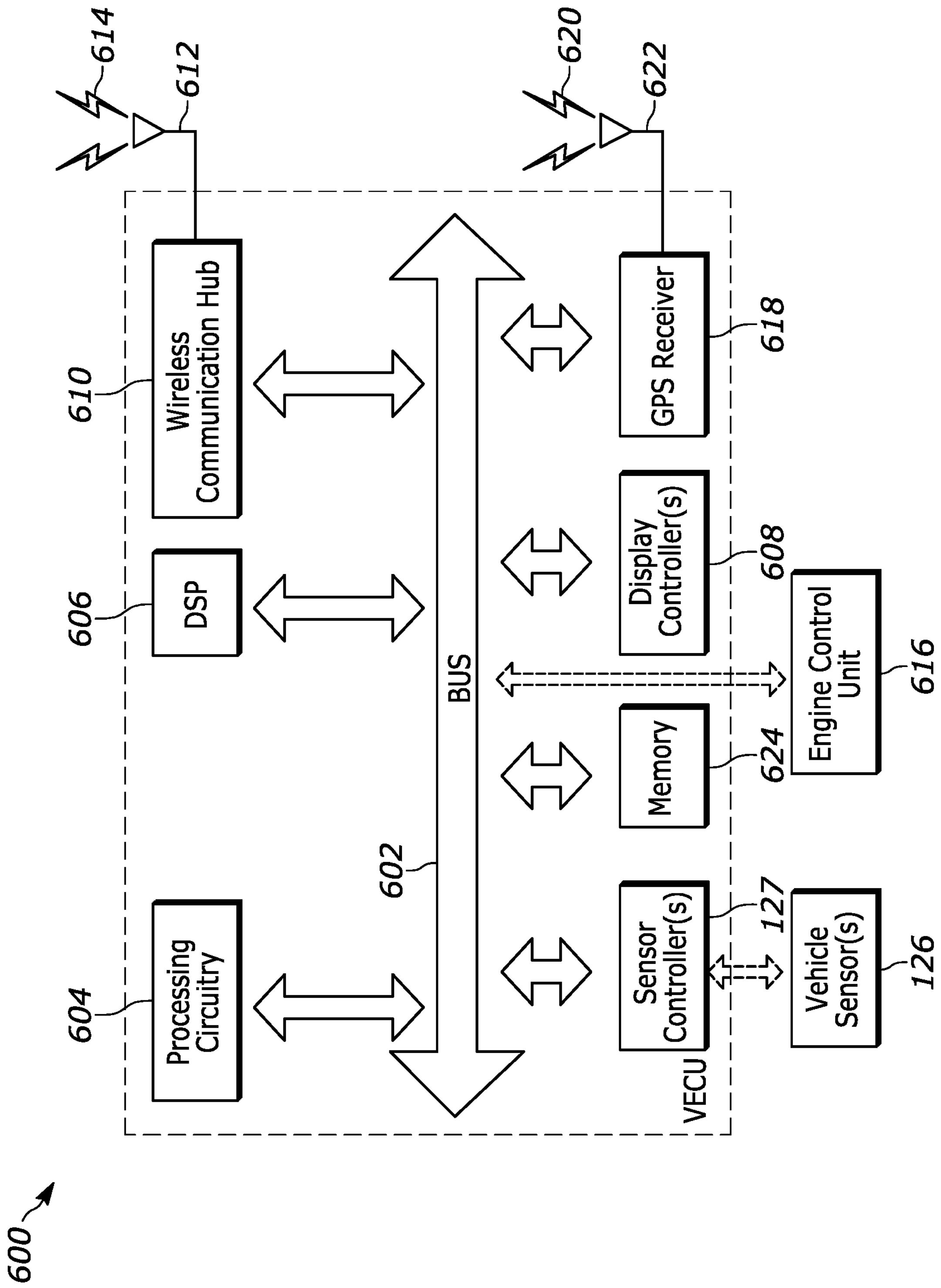
FIG. 6 illustrates a block diagram of a vehicle electronics control system, according to an exemplary embodiment of the present disclosure.

FIG. 6 is a block diagram of internal components of an exemplary embodiment of a computing system 600. The computing system 600 may include or be used to implement the computing systems described above. In this embodiment, the computing system 600 may be embodied at least in part in a vehicle electronics control unit (VECU). It should be noted that FIG. 6 is meant only to provide a generalized illustration of various components, any or all of which may be utilized as appropriate. It can be noted that, in some instances, components illustrated by FIG. 6 can be localized to a single physical device and/or distributed among various networked devices, which may be disposed at different physical locations.

The computing system 600 has hardware elements that can be electrically coupled via a BUS 602. The hardware elements may include processing circuitry 604 which can include, without limitation, one or more processors, one or more special-purpose processors (such as digital signal processing (DSP) chips, graphics acceleration processors, application specific integrated circuits (ASICs), and/or the like), and/or other processing structure or means. The above-described processors can be specially-programmed to perform the operations disclosed herein, including, among others, image processing, data processing, and implementation of the machine learning models described above. Some embodiments may have a separate DSP 606, depending on desired functionality. The computing system 600 can also include one or more display controllers 608, which can control the display devices disclosed above, such as an in-vehicle touch screen, screen of a mobile device, and/or the like.

The computing system 600 may also include a wireless communication hub 610, or connectivity hub, which can include a modem, a network card, an infrared communication device, a wireless communication device, and/or a chipset (such as a Bluetooth device, an IEEE 802.11 device, an IEEE 802.16.4 device, a WiFi device, a WiMax device, cellular communication facilities including 4G, 5G, etc.), and/or the like. The wireless communication hub 610 can permit data to be exchanged with network 114, wireless access points, other computing systems, etc. The communication can be carried out via one or more wireless communication antenna 612 that send and/or receive wireless signals 614.

The computing system 600 can also include or be configured to communicate with an engine control unit 616, or other type of controller 108 described herein. In the case of a vehicle that does not include an internal combustion engine, the engine control unit may instead be a battery control unit or electric drive control unit configured to command propulsion of the vehicle. In response to instructions received via the wireless communications hub 610, the engine control unit 616 can be operated in order to control the movement of the vehicle during, for example, a parking procedure.

The computing system 600 also includes vehicle sensors 126 such as those described above with reference to FIG. 1. These sensors can include, without limitation, one or more accelerometer(s), gyroscope(s), camera(s), radar(s), LiDAR (s), odometric sensor(s), and ultrasonic sensor(s), as well as magnetometer(s), altimeter(s), microphone(s), proximity sensor(s), light sensor(s), and the like. These sensors can be controlled via associated sensor controller(s) 127.

The computing system 600 may also include a GPS receiver 618 capable of receiving signals 620 from one or more GPS satellites using a GPS antenna 622. The GPS receiver 618 can extract a position of the device, using conventional techniques, from satellites of an GPS system, such as a global navigation satellite system (GNSS) (e.g., Global Positioning System (GPS)), Galileo, GLONASS, Compass, Galileo, Beidou and/or other regional systems and/or the like.

The computing system 600 can also include or be in communication with a memory 624. The memory 624 can include, without limitation, local and/or network accessible storage, a disk drive, a drive array, an optical storage device, a solid-state storage device, such as a RAM which can be programmable, flash-updateable and/or the like. Such storage devices may be configured to implement any appropriate data stores, including without limitation, various file systems, database structures, and/or the like. The memory 624 can also include software elements (not shown), including an operating system, device drivers, executable libraries, and/or other code embedded in a computer-readable medium, such as one or more application programs, which may comprise computer programs provided by various embodiments, and/or may be designed to implement methods, and/or configure systems, provided by other embodiments, as described herein. In an aspect, then, such code and/or instructions can be used to configure and/or adapt a general purpose computer (or other device) to perform one or more operations in accordance with the described methods, thereby resulting in a special-purpose computer.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. These memory devices may be non-transitory computer-readable storage mediums for storing computer-executable instructions which, when executed by one or more processors described herein, can cause the one or more processors to perform the techniques described herein. The processor and the memory can be supplemented by, or incorporated in, special purpose logic circuitry.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method of mapping a parking zone using mixed-domain image data, the method comprising:

receiving images from a plurality of cameras mounted about a vehicle, wherein the images depict the parking zone outside of the vehicle;

executing a feature-detection model on the received images to generate image-domain data associated with the parking zone;

generating a bird's-eye-view (BEV) image based on the received images, wherein the BEV image is a top-down, two-dimensional projection of the parking zone, and wherein the BEV image lacks depth information corresponding to a z-axis;

generating BEV-domain data associated with the BEV image, wherein the BEV-domain data includes data associated with parking landmarks in the parking zone as projected onto the two-dimensional BEV image;

generating a tri-perspective view (TPV) image based on the received images, wherein the TPV image comprises three orthogonal planes;

generating TPV-domain data associated with the TPV image, wherein the TPV-domain data includes data associated with the parking landmarks in the parking zone, and wherein the TPV-domain data includes an aggregation of two-dimensional projections of points from the received images onto each of the three orthogonal planes;

localizing the vehicle within the parking zone based on the image-domain data, the BEV-domain data, and the TPV-domain data to generate localization data;

mapping the parking zone based on the image-domain data, the BEV-domain data, the TPV-domain data, and the localization data;

receiving vehicle movement data from one or more inertial measurement unit (IMU), wherein the IMU includes at least one of an accelerometer, gyroscope, or magnetometer, and wherein the vehicle movement data represents movement of the vehicle; and compensating the image-domain data based on the movement data, and compensating the BEV-domain data based on the movement data, wherein the compensation of the BEV-domain data is separate from the compensation of the image-domain data.

2. The method of claim 1, wherein the mapping of the parking zone is based on the compensated image-domain data and the compensated BEV-domain data.

3. The method of claim 1, wherein the movement data indicates the vehicle has traveled upward or downward, and the compensating includes adjusting a shape of the parking landmarks in the BEV-domain data based on the movement data.

4. The method of claim 1, wherein the compensating includes negating a shift in the images based on the vehicle movement data.

5. The method of claim 1, wherein the IMU is a 6 degree-of-freedom (6DOF) sensor or 9 degree-of-freedom (9DOF) sensor.

6. A method of mapping a parking zone using mixed-domain image data, the method comprising:

generating image-domain data based on raw image data received from a plurality of cameras mounted on the a, wherein the raw image data is associated with the parking zone outside the vehicle, and wherein the image-domain data is generated by a feature-detection machine learning model;

generating a bird's-eye-view (BEV) image based on the raw image data, wherein the BEV image is a projected image of the parking zone, wherein the BEV image is a top-down, two-dimensional projection of the parking zone;

generating BEV-domain data associated with the BEV image, wherein the BEV-domain data includes data associated with parking landmarks in the parking zone as projected onto the two-dimensional BEV image;

receiving vehicle motion data from an inertial measurement unit (IMU) mounted to the vehicle, wherein the IMU includes at least one of an accelerometer, gyroscope, of magnetometer;

localizing the vehicle within the parking zone based on the BEV-domain data and the image-domain data to generate localization data;

separately compensating the BEV-domain data and the image-domain data based on the vehicle motion data received from the IMU;

generating a tri-perspective view (TPV) image based on the raw image data wherein the TPV image comprises three orthogonal planes;

generating TPV-domain data associated with the TPV image, wherein the TPV-domain data includes data associated with the parking landmarks in the parking zone, and wherein the TPV-domain data includes an aggregation of two-dimensional projections of points from the received images onto each of the three orthogonal planes;

mapping the parking zone based on the compensated BEV-domain data, the compensated image-domain data, the IPV-domain data, and the localization data.

7. The method of claim 6, wherein the compensating includes compensating the TPV-domain data, and the mapping is further based on the compensated TPV-domain data.

8. The method of claim 6, wherein the IMU is a 6 degree-of-freedom (6DOF) or 9 degree-of-freedom (9DOF) sensor.

9. The method of claim 6, wherein the motion data indicates the vehicle has traveled upward or downward, and the compensating includes adjusting a shape of the parking landmarks in the BEV-domain data based on the motion data.

10. The method of claim 6, wherein the parking landmarks include a parking space line.

11. A system for mapping a parking zone using mixed-domain image data, the system comprising:

a plurality of image sensors mounted to a vehicle and configured to generate raw image data, wherein the raw image data is associated with the parking zone outside the vehicle;

an inertial measurement unit (IMU) mounted to the vehicle and configured to generate movement data associated with movement of the vehicle, wherein the IMU includes at least one of an accelerometer, gyroscope, or magnetometer;

one or more processors; and memory coupled to the one or more processors, the memory storing instructions that, when executed by the one or more processors, cause the one or more processors to:

generate image-domain data based on the raw image data, wherein the image-domain data is generated by a feature-detection machine learning model;

generate a bird's-eye-view (BEV) image based on the raw image data, wherein the BEV image is a projected image of the parking zone, wherein the BEV image is a top-down, two-dimensional projection of the parking zone;

generate BEV-domain data associated with the BEV image, wherein the BEV-domain data includes data associated with parking landmarks in the parking zone as projected onto the two-dimensional BEV image;

generate a tri-perspective view (TPV) image based on the raw image data, wherein the TPV image comprises three orthogonal planes, and generate TPV-domain data associated with the TPV image, wherein the TPV-domain data includes data associated with the parking landmarks in the parking zone, and wherein the TPV-domain data includes an aggregation of two-dimensional projections of points from the received images onto each of the three orthogonal planes;

localize the vehicle within the parking zone based on the BEV-domain data, the image-domain data, and the TPV-domain data to generate localization data;

separately compensate the BEV-domain data, the image-domain data, and the TPV-domain data based on the vehicle movement data received from the IMU; and output a map of the parking zone based on the compensated BEV-domain data, the compensated image-domain data, the compensated TPV-domain data, and the localization data.

12. The system of claim 11, wherein the IMU is a 6 degree-of-freedom (6DOF) sensor or 9 degree-of-freedom (9DOF) sensor.

13. The system of claim 11, wherein the movement data indicates the vehicle has traveled upward or downward, and the compensation of the BEV-domain data includes an adjustment in a shape of the parking landmarks in the BEV-domain data based on the movement data.

* * * * *